UNITED STATES PATENT OFFICE.

LUTHER P. BROWN, OF CHICAGO, ILLINOIS, ASSIGNOR OF ONE-HALF TO C. H. KENWORTHY, OF CHICAGO, ILLINOIS.

PROCESS FOR GREASE-PROOFING AND MOISTURE-PROOFING PAPER, &c.

No. 838,607. Specification of Letters Patent. Patented Dec. 18, 1906.

Application filed January 30, 1905. Serial No. 243,418.

*To all whom it may concern:*

Be it known that I, LUTHER P. BROWN, a citizen of the United States, and a resident of Chicago, in the county of Cook and State of Illinois, have invented certain new and useful Improvements in Processes for Grease-Proofing and Moisture-Proofing Paper, &c., of which the following is a full, clear, and exact description.

The object of my invention is to prepare paper, pasteboard, &c., so that the same is positively grease-proof and moisture-proof and which is at the same time capable of receiving and retaining any printed matter it may be desirable to impress thereon. The paper after being treated by my process can also be attached to other objects or portions of itself by means of glue or other cement without any trouble as now experienced in attempting to glue waxed papers. In view of the fact that no injurious ingredients are employed in my process the paper or pasteboard can be safely used and is designed for the manufacture of boxes, cartons, packages, &c., containing food-stuffs and may be folded as desired without cracking.

The improved process of moisture-proofing hereinafter described is completed in three successive steps, each having close connection with the others and depending upon each other for the successful accomplishment of the objects in view.

A soluble compound must first be completed before the steps of the process are commenced. The formula for this ingredient is as follows: soda, two ounces; olive-oil, three ounces; glycerin, one ounce; tallow, four ounces; resin, one ounce.

The tallow is melted and when the impurities rise to the top the same is skimmed. Then add the olive-oil in small quantities and bring the mixture to a boil, at which time the soda is added. After melting the resin and mixing the glycerin with it the same is now added to the above ingredients and the whole composition brought to a boil. The mixture is boiled until a foam arises and covers the surface of the liquid, after which it is permitted to stand until this foam settles. Skim the liquid, and then pour out into molds and leave it to cool. This soluble compound is utilized as a whole ingredient in preparing the "filler" composition now to be described. This filler comprises the following ingredients: soluble compound, (above referred to,) three ounces; gelatin, two ounces; water, fifteen ounces; skimmed milk, fifteen ounces; glucose, two ounces; casein, three ounces; glycerin, twenty-four ounces; dextrin solution, (six ounces of water and one ounce dextrin,) seven ounces; talc, one and one-half ounces.

The soluble compound is dissolved in fifteen ounces of water, to which is added the gelatin and the whole mixed together. Six ounces of water are poured on the dextrin and heated to a boiling-point. Then it is stirred into the above mixture, to which latter is added the talc and the whole boiled. The milk and glucose are now united thoroughly and the casein stirred into the same, after which the mixture thus prepared is mixed with the remainder of the mass and the glycerin added. The entire mass in ingredients forming this filler part of the process is heated to 212° Fahrenheit.

Part two, which I prefer to call the "hardening-bath," is composed of the following ingredients: water, sixty ounces; alum solution, (two ounces alum dissolved in six ounces of water,) eight ounces; formalin, one ounce.

Part three, which I prefer to call the "coating-bath," is composed of the following ingredients: silicate of soda, thirty ounces; glycerin, twenty ounces; soluble compound, (above described,) three ounces; dextrin solution, (one ounce dextrin dissolved in six ounces of hot water,) seven ounces.

When it is desired to waterproof with the above compositions, the three parts are placed in vats or tanks. The paper or pasteboard is submerged in the filler while the latter is at 212° Fahrenheit, and after the same has been thoroughly impregnated with said filler it is removed therefrom and allowed to partially dry and run through pressure-rollers. The paper is then passed through the hardening-bath and allowed to drip. After heating the coating-bath to a boiling-point the paper is passed therethrough and is then received by heated calendering-rollers, where its surface is given a glossy finish.

In the above compositions the relative properties of the ingredients are as follows: The gelatin and talc are utilized for the purpose of a filling, and glycerin, milk, and casein close the pores and unite the gelatin and talc. This portion of the composition makes the paper or pasteboard pliable. The "toning-bath" fixes or sets the filler and prepares the board for the coating, which latter gives it the glossy finish produced by the glycerin and dextrin.

If desired, I can substitute common yellow soap for soda, olive-oil, glycerin, tallow, and resin; but I have found in practice that the use of said last-enumerated ingredients produce more satisfactory results. I can also instead of using three ounces of casein use one and one-half ounces of pearlash and one and one-half ounces of potassium.

What I claim as new is—

1. A process for grease-proofing and moisture-proofing consisting in treating the material successively to a filler composed of gelatin, water, skimmed milk, glucose, crude casein, glycerin, dextrin, talc and a compound soluble in liquid, composed of soda, olive-oil, glycerin, tallow, and resin; a hardening-bath; and a coating-bath.

2. A process for grease-proofing and moisture-proofing consisting in treating the material successively to a filler; a hardening-bath; and a coating-bath composed of soda, glycerin, dextrin, and a compound soluble in liquid composed of soda, olive-oil, glycerin, tallow, and resin.

3. A process for grease-proofing and moisture-proofing consisting in treating the material successively to a filler composed of gelatin, water, skimmed milk, glucose, and casein, glycerin, dextrin, talc and a compound soluble in liquid composed of soda, olive-oil, glycerin, tallow, and resin; a hardening-bath composed of water, alum, and formalin; and a coating-bath.

4. A process for grease-proofing and moisture-proofing consisting in treating the material successively to a filler; a hardening-bath composed of water, alum, and formalin; and a coating-bath composed of soda, glycerin, dextrin, and a compound soluble in liquid composed of soda, olive-oil, glycerin, tallow, and resin.

5. A process for grease-proofing and moisture-proofing consisting in treating the material successively to a filler composed of gelatin, water, skimmed milk, glucose, crude casein, glycerin, dextrin, talc, and a compound soluble in liquid composed of soda, olive-oil, glycerin, tallow, and resin; a hardening-bath; and a coating-bath consisting of soda, glycerin, dextrin, and a compound soluble in liquid composed of soda, glycerin, olive-oil, tallow, and resin.

6. A process for grease-proofing and moisture-proofing consisting in treating the material successively to a filler composed of gelatin, water, skimmed milk, glucose, crude casein, glycerin, dextrin, talc and a compound soluble in liquid, composed of soda, olive-oil, glycerin, tallow, resin, and alkalin lye; a hardening-bath composed of water, alum, and formalin; and a coating-bath composed of soda, glycerin, dextrin and a compound soluble in liquid composed of soda, olive-oil, glycerin, tallow, and resin.

7. A process for grease-proofing and moisture-proofing consisting in treating the material first to a filler composed of two ounces of gelatin, fifteen ounces of water, fifteen ounces of skimmed milk, two ounces of glucose, three ounces of crude casein, twenty-four ounces of glycerin, one ounce of dextrin, one and one-half ounces of talc, and three ounces of a compound soluble in liquid composed of two ounces of soda, three ounces of olive-oil, one ounce of glycerin, four ounces of tallow, and one ounce of resin, second to a hardening-bath and third to a coating-bath.

8. A process for grease-proofing and moisture-proofing consisting in treating the material, first to a filler, second to a hardening-bath composed of sixty ounces of water, two ounces of alum and one ounce of formalin, and third to a coating-bath.

9. A process for grease-proofing and moisture-proofing consisting in treating the material first to a filler, second to a hardening-bath, third to a coating-bath composed of thirty ounces of soda, twenty ounces of glycerin, one ounce of dextrin, and three ounces of a compound soluble in liquid composed of two ounces of soda, three ounces of olive-oil, one ounce of glycerin, four ounces of tallow, and one ounce of resin.

10. A process for grease-proofing and moisture-proofing consisting in treating the material successively to a filler composed of gelatin two ounces, water fifteen ounces, skimmed milk fifteen ounces, glucose two ounces, crude casein three ounces, glycerin twenty-four ounces, dextrin one ounce, talc one and one-half ounces, and three ounces of a compound soluble in liquid composed of soda two ounces, olive-oil three ounces, glycerin one ounce, tallow four ounces, and resin one ounce; a hardening-bath composed of water sixty ounces, alum two ounces, and formalin one ounce, and a coating-bath composed of soda thirty ounces, glycerin twenty ounces, dextrin one ounce, and three ounces of said soluble compound.

In testimony whereof I have hereunto set my hand this 30th day of December, A. D. 1904.

LUTHER P. BROWN.

Witnesses:
FRANK D. THOMASON,
E. K. LUNDY.